(12) United States Patent
Cerny et al.

(10) Patent No.: US 12,251,345 B2
(45) Date of Patent: Mar. 18, 2025

(54) PATIENT SUPPORT APPARATUS WITH LOAD CELL ASSEMBLIES

(71) Applicant: Stryker Corporation, Kalamazoo, MI (US)

(72) Inventors: Jason James Cerny, London (CA); Jeffrey C. Shiery, East Leroy, MI (US); Megan Grace MacKellar, Vicksburg, MI (US); Alfred James Dacey, IV, Mendon, MI (US)

(73) Assignee: Stryker Corporation, Portage, MI (US)

( * ) Notice: Subject to any disclaimer, the term of this patent is extended or adjusted under 35 U.S.C. 154(b) by 371 days.

(21) Appl. No.: 17/780,297

(22) PCT Filed: Nov. 24, 2020

(86) PCT No.: PCT/US2020/061966
§ 371 (c)(1),
(2) Date: May 26, 2022

(87) PCT Pub. No.: WO2021/108377
PCT Pub. Date: Jun. 3, 2021

(65) Prior Publication Data
US 2022/0409460 A1    Dec. 29, 2022

Related U.S. Application Data

(60) Provisional application No. 62/941,095, filed on Nov. 27, 2019.

(51) Int. Cl.
*A61G 7/05* (2006.01)
*A61G 7/015* (2006.01)
*A61G 7/10* (2006.01)

(52) U.S. Cl.
CPC ............ *A61G 7/0527* (2016.11); *A61G 7/015* (2013.01); *A61G 7/1046* (2013.01); *A61G 2203/44* (2013.01)

(58) Field of Classification Search
USPC .......................................................... 177/144
See application file for complete search history.

(56) References Cited

U.S. PATENT DOCUMENTS

| 4,926,951 A | 5/1990 | Carruth et al. |
| 5,269,388 A | 12/1993 | Reichow et al. |

(Continued)

FOREIGN PATENT DOCUMENTS

| WO | 2015008677 A1 | 1/2015 |
| WO | 2019000730 A1 | 1/2019 |

OTHER PUBLICATIONS

International Search Report for Application No. PCT/US2020/061966 dated Feb. 19, 2021, 1 page.

(Continued)

*Primary Examiner* — Jacques M Saint Surin
(74) *Attorney, Agent, or Firm* — Howard & Howard Attorneys PLLC

(57) ABSTRACT

A patient support apparatus comprises a patient support deck and a base frame assembly. The base frame assembly comprises a first frame assembly supporting a plurality of wheels, and a second frame assembly supporting one or more lift arms that are coupled to the patient support deck to the second frame assembly. A load cell assembly is interposed between the first and second frame assemblies to sense force acting on the first frame assembly associated with weight applied to the second frame assembly. The load cell assembly comprises: a load cell element coupled to one of the first frame assembly and the second frame assembly; a first pivot mount operatively attached to the load cell element; a second pivot mount operatively attached to the other of the first frame assembly and the second frame assembly; and a swing link arranged for pivoting movement.

20 Claims, 14 Drawing Sheets

(56) References Cited

U.S. PATENT DOCUMENTS

| | | |
|---|---|---|
| 6,518,520 B2 | 2/2003 | Jones et al. |
| 6,924,441 B1 | 8/2005 | Mobley et al. |
| 7,253,366 B2 | 8/2007 | Bhai |
| 7,398,571 B2 | 7/2008 | Souke et al. |
| 9,012,792 B2 | 4/2015 | Gui |
| 9,383,250 B2 | 7/2016 | Receveur et al. |
| 9,486,373 B2 | 11/2016 | Lambarth et al. |
| 9,510,981 B2 | 12/2016 | Lambarth et al. |
| 10,054,479 B2 | 8/2018 | Nachtigal et al. |
| 10,111,794 B2 | 10/2018 | Riley et al. |
| 10,117,798 B2 | 11/2018 | Lemire et al. |
| 10,260,933 B2 | 4/2019 | Kostic et al. |
| 10,276,021 B2 | 4/2019 | Pirio et al. |
| 10,285,886 B2 | 5/2019 | Wako et al. |
| 10,470,954 B2 * | 11/2019 | Cox .................. A61G 7/0524 |
| 11,090,209 B2 * | 8/2021 | Paul .................. A61G 7/0514 |
| 11,116,684 B2 * | 9/2021 | Poulos .................. A61G 5/14 |
| 11,395,783 B2 * | 7/2022 | Shiery .................. A61G 7/0527 |
| 11,484,450 B2 * | 11/2022 | Cutler .................. A61G 7/0514 |
| 11,806,291 B2 * | 11/2023 | Cutler .................. A61G 7/0507 |
| 2003/0090383 A1 | 5/2003 | Conway |
| 2006/0059814 A1 | 3/2006 | Metz et al. |
| 2015/0300872 A1 | 10/2015 | Hirose et al. |
| 2016/0081592 A1 | 3/2016 | Ishikawa et al. |
| 2017/0234723 A1 | 8/2017 | Charles et al. |
| 2018/0008168 A1 | 1/2018 | Pearlman et al. |
| 2018/0028383 A1 | 2/2018 | Stryker et al. |
| 2019/0029903 A1 | 1/2019 | Riley et al. |
| 2020/0043607 A1 | 2/2020 | Zerhusen et al. |

OTHER PUBLICATIONS

English language abstract and machine-assisted English translation for WO 2015/008677 A1 extracted from espacenet.com database on Jun. 1, 2022, 42 pages.

English language abstract and machine-assisted English translation for WO 2019/000730 A1 extracted from espacenet.com database on Jun. 1, 2022, 12 pages.

* cited by examiner

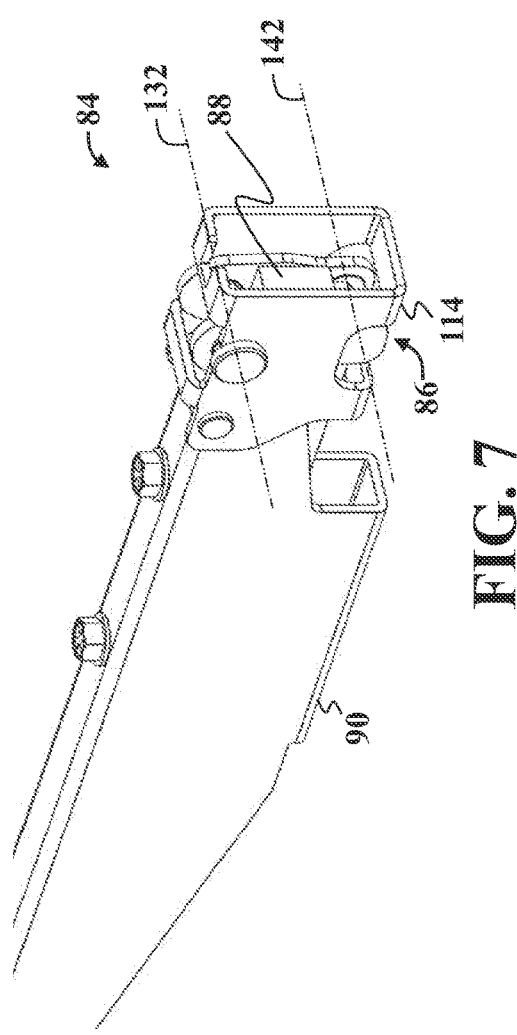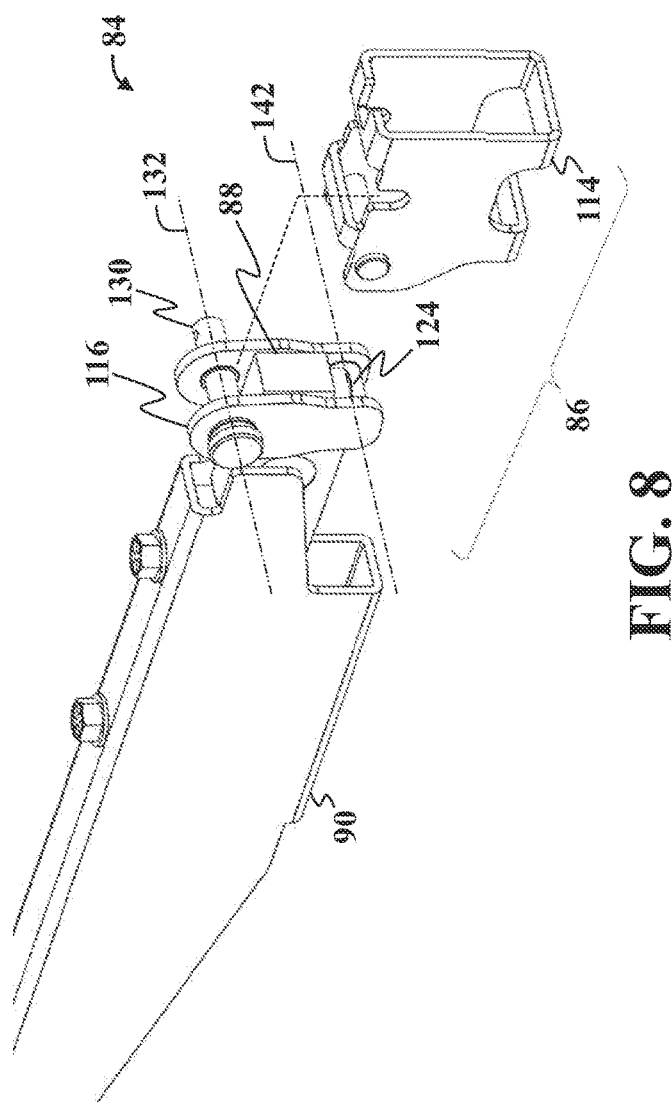

PATIENT SUPPORT APPARATUS WITH LOAD CELL ASSEMBLIES

CROSS-REFERENCE TO RELATED APPLICATIONS

This application claims priority to and all the benefits of U.S. Provisional Patent Application No. 62/941,095, filed on Nov. 27, 2019.

BACKGROUND

Patient support apparatuses, such as hospital beds, stretchers, cots, tables, and wheelchairs, facilitate care of patients in a health care setting. Conventional patient support apparatuses comprise a base, a support frame, and a patient support deck upon which the patient is supported. Bariatric patient support apparatuses are generally designed to support heavier weight loads than conventional patient support beds. Certain conventional bariatric patient support apparatuses may comprise load cells for measuring the weight being supported by the base. Loading and unloading of bariatric patients from these types of known bariatric patient support apparatuses can cause high contact forces between the load cell and bed frame interface resulting in deformation of the load cell interface leading to inaccurate load scale readings.

A patient support apparatus with an additional support assembly between the load cell contact point and bed frame designed to overcome one or more of the aforementioned disadvantages is desired.

SUMMARY

The subject disclosure is directed towards a patient support apparatus comprising a patient support deck for supporting a patient and a base frame assembly configured to support the patient support deck from a ground surface. The base frame assembly defines a longitudinal axis and a transverse axis and assembly comprises a first frame assembly supporting a plurality of wheels to facilitate movement of the patient support apparatus along the ground surface, and a second frame assembly supporting one or more lift arms coupling the patient support deck to the second frame assembly. A load cell assembly is interposed between the first and second frame assemblies to sense force acting on the first frame assembly associated with weight applied to the second frame assembly. The load cell assembly comprises: a load cell element coupled to one of the first frame assembly and the second frame assembly; a first pivot mount operatively attached to the load cell element; a second pivot mount operatively attached to the other of the first frame assembly and the second frame assembly; and a swing link. The swing link is arranged for pivoting movement relative to the first pivot mount and arranged for pivoting movement relative to the second pivot mount such that the second frame assembly is movable with respect to the first frame assembly relative to a first axis arranged parallel to the longitudinal axis, and is movable with respect to the first frame assembly relative to a second axis spaced from the first axis.

The subject disclosure is also directed towards a load cell assembly for use with a patient support apparatus comprising a base frame assembly that defines a longitudinal axis and a transverse axis and comprises a first frame assembly and a second frame assembly. The load cell comprises a first frame assembly and a second frame assembly. The load cell assembly comprises a load cell element operatively attached to the second frame assembly and cell element supporting a pivot mount. The load cell assembly also comprises a swing link is coupled to the first frame assembly. The swing link includes a first shaft arranged for pivoting movement relative to the first frame assembly, a second shaft arranged for pivoting movement relative to the pivot mount, and a link coupled to the first shaft and to the second shaft. The swing link is arranged to pivot about a pivot axis defined by the first shaft to permit the second frame assembly to move relative to the first frame assembly along the longitudinal axis.

BRIEF DESCRIPTION OF THE DRAWINGS

FIG. 7 is a perspective view of the load cell assembly of FIG. 5.

FIGS. 8-10 are exploded views of the load cell assembly of FIG. 7.

DETAILED DESCRIPTION

Figure 1:
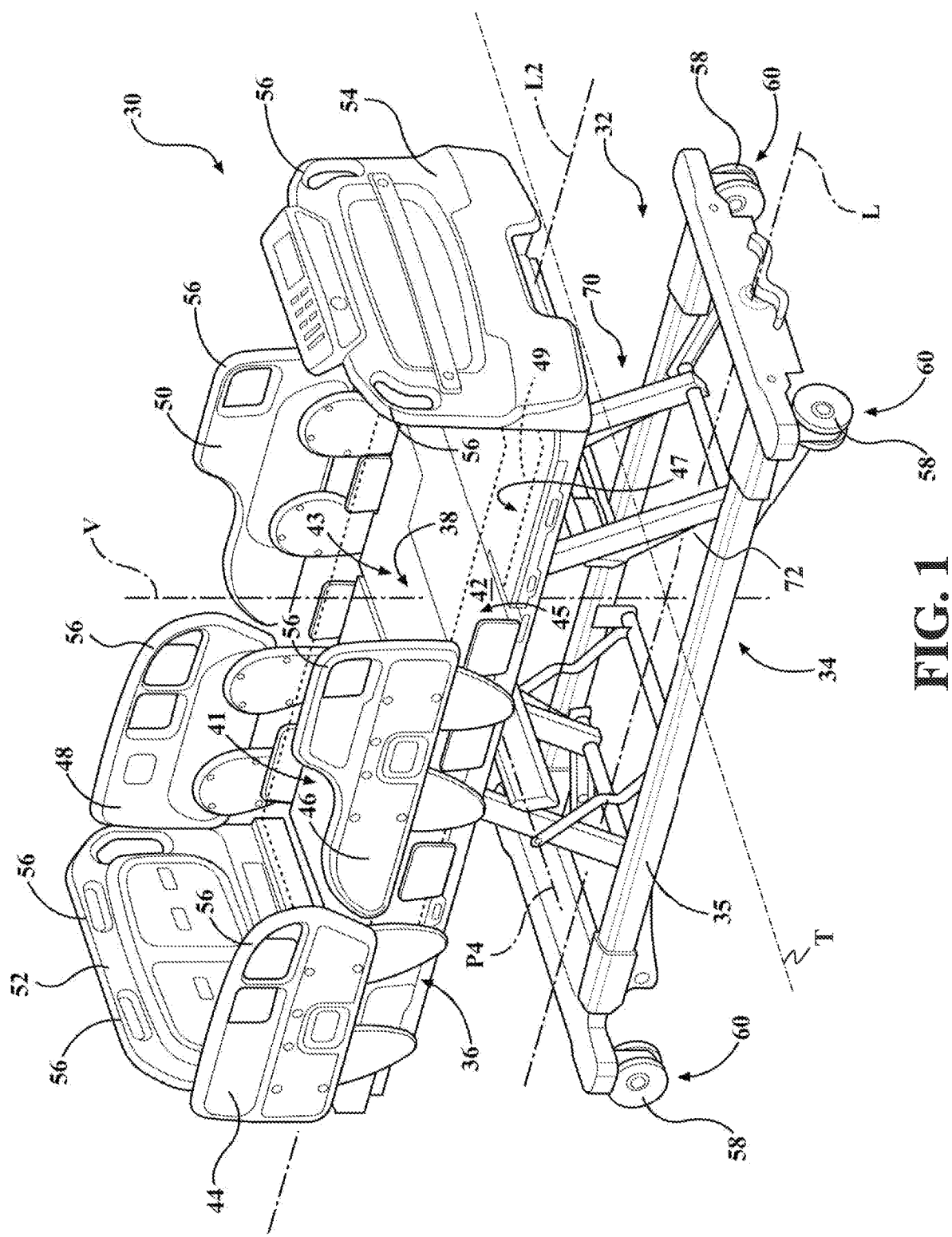
FIG. 1 is a perspective view of a patient support apparatus.
Figure 2:
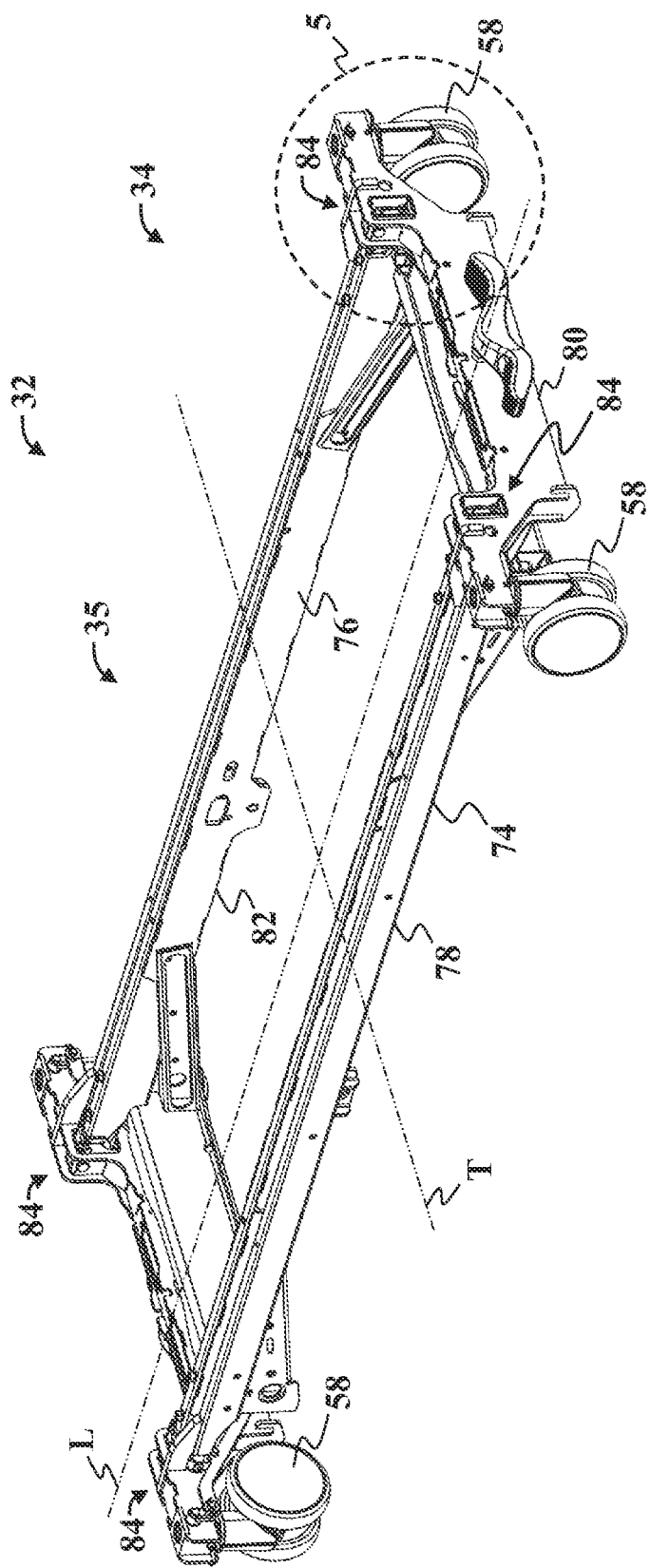
FIG. 2 is a perspective view of a support structure of the patient support apparatus of FIG. 1.
Figure 3:
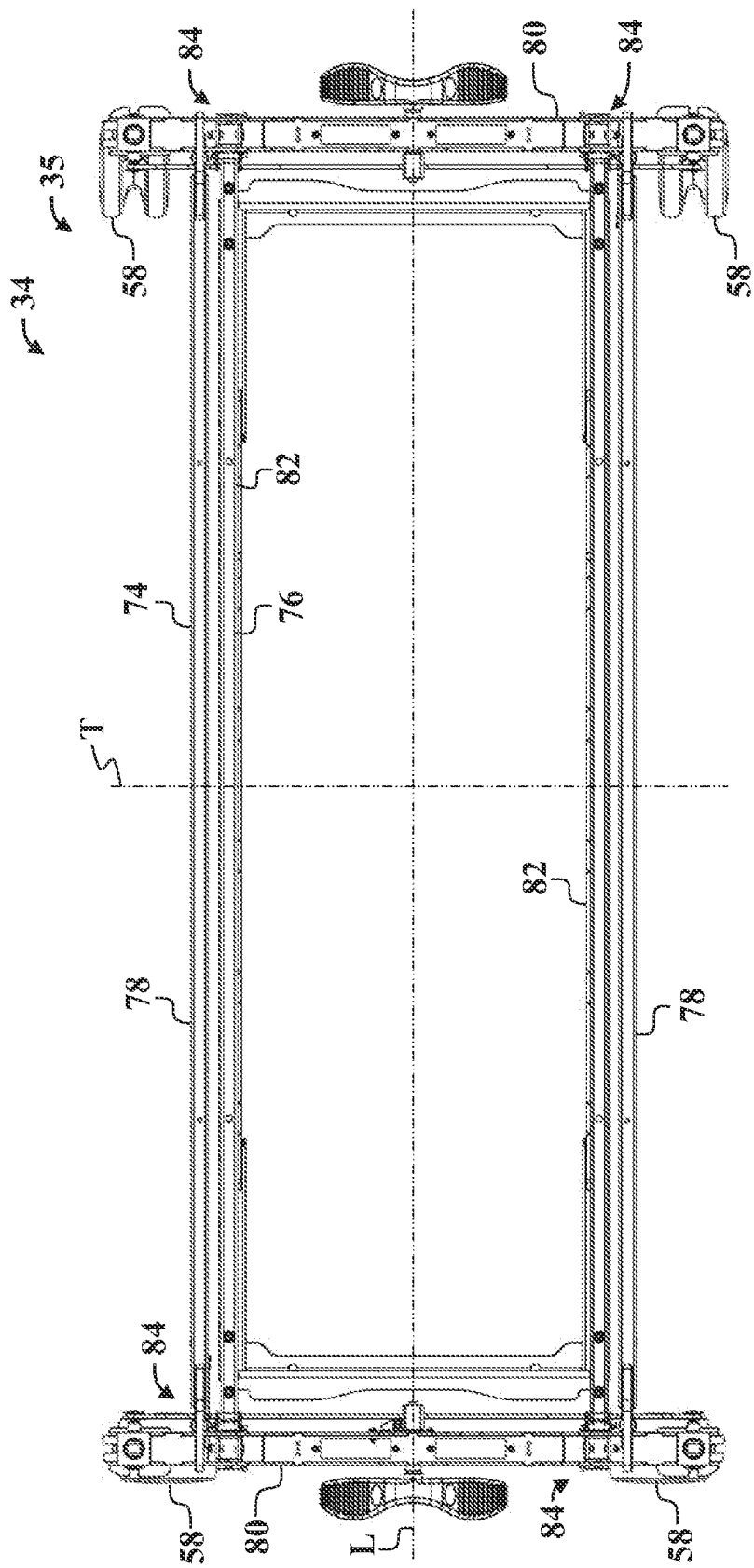
FIG. 3 is a top view of the support structure shown in FIG. 2.
Figure 4:
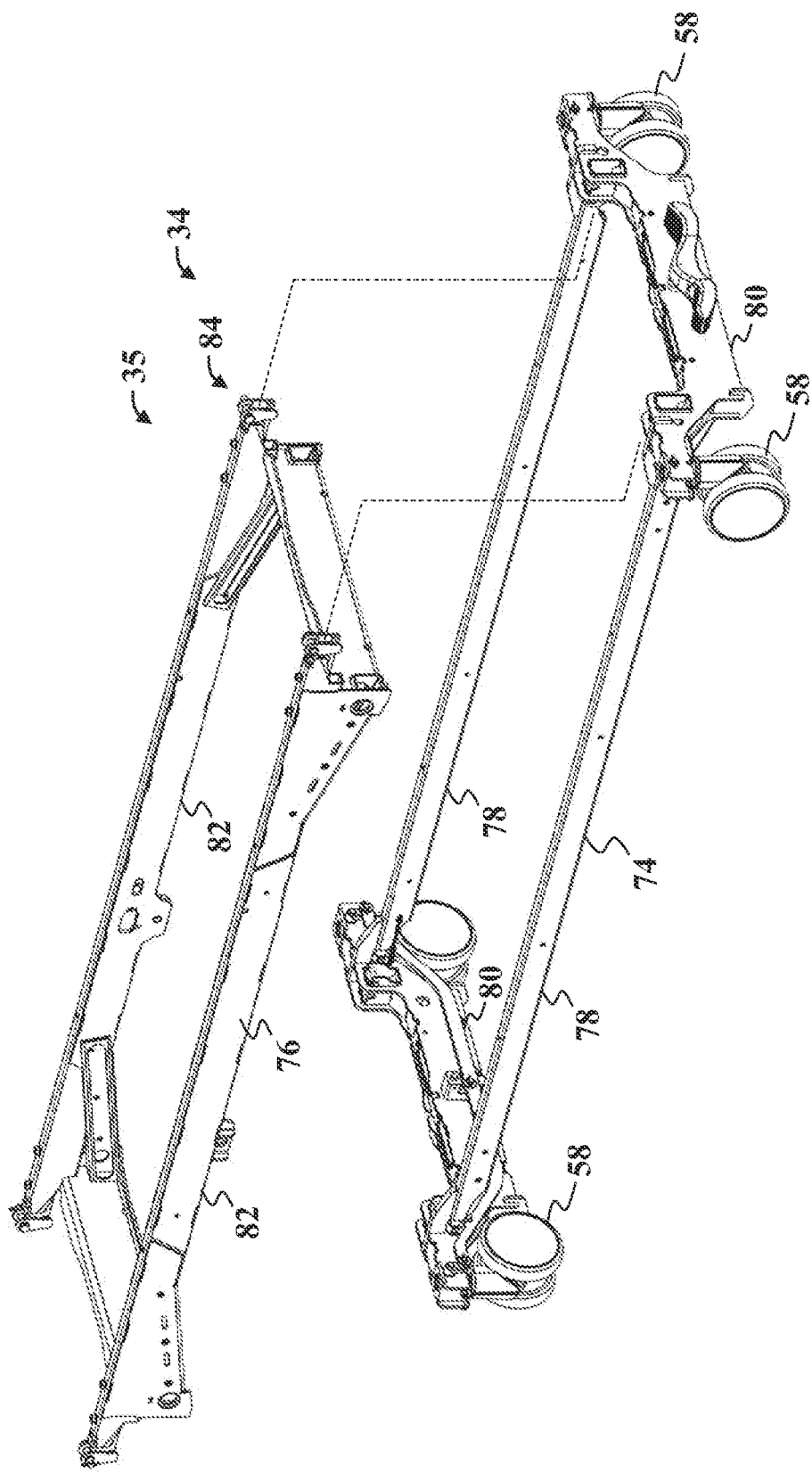
FIG. 4 is an exploded view of the support structure shown in FIG. 2.
Figure 5:
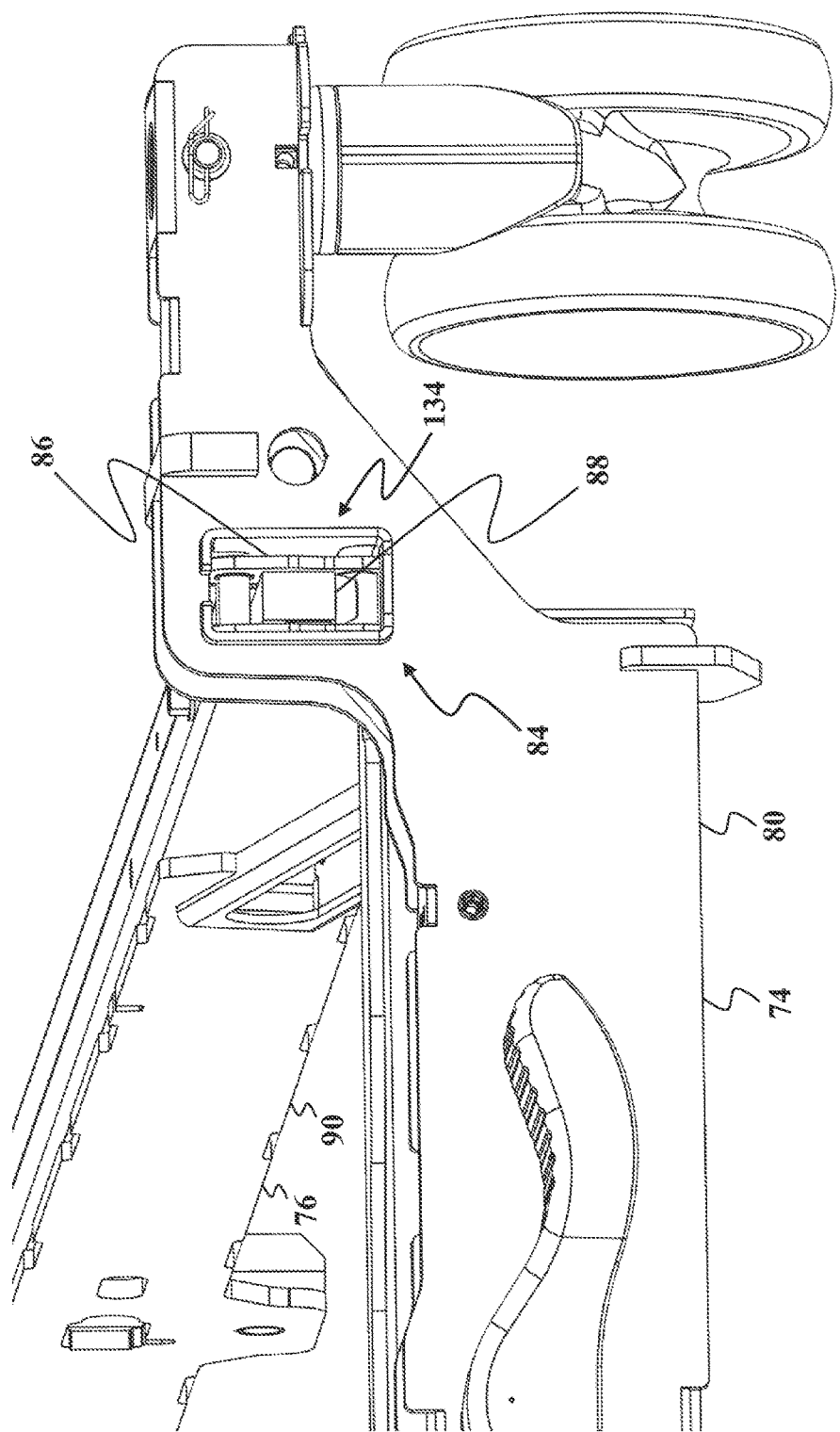
FIG. 5 is a perspective view of a portion of the support structure shown in Area 5 of FIG. 2, illustrating a load cell assembly.
Figure 6:
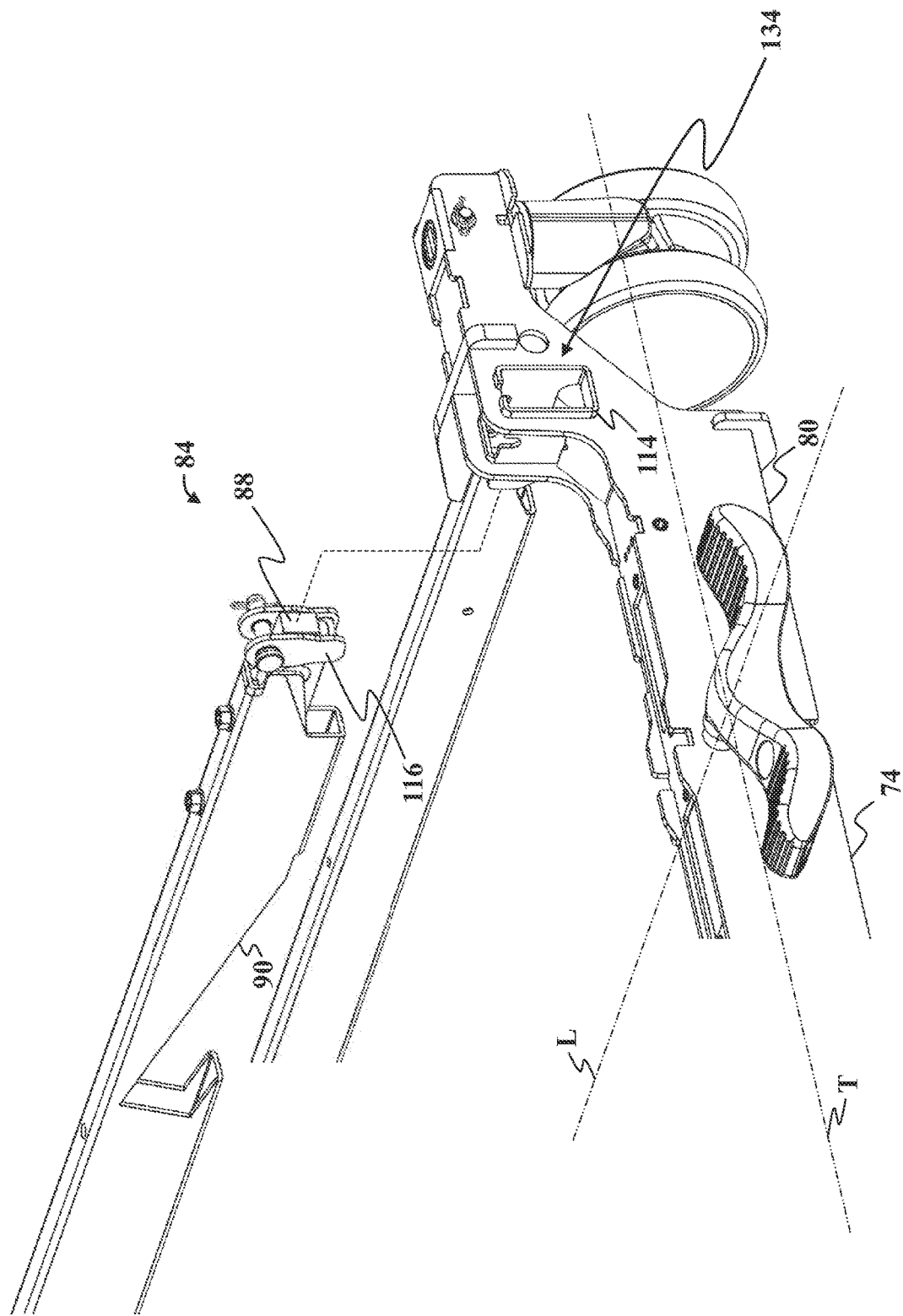
FIG. 6 is an exploded view of the support structure shown in FIG. 5, illustrating the load cell assembly.

Referring to FIG. 1, a patient support apparatus 30 is shown for supporting a patient in a health care setting. The patient support apparatus 30 illustrated in FIG. 1 comprises a hospital bed. In other examples, however, the patient support apparatus 30 may comprise a stretcher, cot, table, wheelchair, or similar apparatus utilized in the care of a patient.

A support structure 32 provides support for the patient. The support structure 32 illustrated in FIG. 1 comprises a base 34 and a deck support frame 36. The base 34 comprises a base frame assembly 35. The deck support frame 36 is spaced above the base frame assembly 35 in FIG. 1. The support structure 32 also comprises a patient support deck 38 disposed on the deck support frame 36. The patient support deck 38 comprises several sections, some of which are pivotable relative to the deck support frame 36, such as a back section 41, a seat section 43, a leg section 45, and a foot section 47. The patient support deck 38 provides a patient support surface 42 upon which the patient is supported.

A mattress 49 (shown in hidden lines in FIG. 1) is disposed on the patient support deck 38 during use. The mattress 49 comprises a secondary patient support surface upon which the patient is supported. The base 34, deck support frame 36, patient support deck 38, and patient support surfaces 42 each have a head end and a foot end corresponding to designated placement of the patient's head and feet on the patient support apparatus 30. The base 34 comprises or otherwise defines a longitudinal axis L along its length from the head end to the foot end, and a transverse axis T arranged perpendicular to the longitudinal axis L. The base 34 also comprises or otherwise defines a vertical axis V arranged crosswise (e.g., perpendicularly) to the longitudinal axis L (and also to the transverse axis T) along which the deck support frame 36 is lifted and lowered relative to the base 34.

A lift device 70 may be coupled to the base 34 and the deck support frame 36 to raise and lower the deck support frame 36 to minimum and maximum heights of the patient support apparatus 30, and intermediate positions therebetween. The lift device 70 comprises one or more lift arms 72 coupling the deck support frame 36 to the base 34. The lift device 70 comprises one or more lift actuators that are coupled to at least one of the base 34 and the deck support frame 36 to raise and lower the deck support frame 36 and patient support deck 38 relative to the floor surface and the base 34. The lift device 70 may be configured to operate in the same manner or a similar manner as the lift mechanisms shown in U.S. Pat. Nos. 7,398,571, 9,486,373, 9,510,981, and/or U.S. Patent Application Publication No. 2018/0028383, hereby incorporated herein by reference.

The deck support frame 36 comprises a second longitudinal axis L2 along its length from the head end to the foot end. The construction of the support structure 32 may take on any known or conventional design, and is not limited to that specifically set forth above. In addition, the mattress 49 may be omitted in certain examples, such that the patient rests directly on the patient support surface 42.

Side rails 44, 46, 48, 50 are coupled to the deck support frame 36 and thereby supported by the base 34. A first side rail 44 is positioned at a right head end of the deck support frame 36. A second side rail 46 is positioned at a right foot end of the deck support frame 36. A third side rail 48 is positioned at a left head end of the deck support frame 36. A fourth side rail 50 is positioned at a left foot end of the deck support frame 36. If the patient support apparatus 30 is a stretcher or a cot, there may be fewer side rails. The side rails 44, 46, 48, 50 are movable between a raised position in which they block ingress and egress into and out of the patient support apparatus 30, one or more intermediate positions, and a lowered position in which they are not an obstacle to such ingress and egress. In still other configurations, the patient support apparatus 30 may not comprise any side rails.

A headboard 52 and a footboard 54 are coupled to the deck support frame 36. In other examples, when the headboard 52 and footboard 54 are utilized, the headboard 52 and footboard 54 may be coupled to other locations on the patient support apparatus 30, such as the base 34. In still other examples, the patient support apparatus 30 does not comprise the headboard 52 and/or the footboard 54.

Caregiver interfaces 56, such as handles, are shown integrated into the footboard 54 and side rails 44, 46, 48, 50 to facilitate movement of the patient support apparatus 30 over floor surfaces. Additional caregiver interfaces 56 may be integrated into the headboard 52 and/or other components of the patient support apparatus 30. The caregiver interfaces 56 are graspable by the caregiver to manipulate the patient support apparatus 30 for movement.

Other forms of the caregiver interface 56 are also contemplated. The caregiver interface 56 may comprise one or more handles coupled to the deck support frame 36. The caregiver interface 56 may simply be a surface on the patient support apparatus 30 upon which the caregiver applies force to cause movement of the patient support apparatus 30 in one or more directions, also referred to as a push location. This may comprise one or more surfaces on the deck support frame 36 or base 34. This could also comprise one or more surfaces on or adjacent to the headboard 52, footboard 54, and/or side rails 44, 46, 48, 50. In other examples, the caregiver interface 56 may comprise separate handles for each hand of the caregiver. For example, the caregiver interface 56 may comprise two handles.

Wheels 58 are coupled to the base 34 to facilitate transport over the floor surfaces. The wheels 58 are arranged in each of four quadrants of the base 34 adjacent to corners of the base 34. In the example shown, the wheels 58 are caster wheels able to rotate and swivel relative to the support structure 32 during transport. Each of the wheels 58 forms part of a caster assembly 60. Each caster assembly 60 is mounted to the base 34. It should be understood that various configurations of the caster assemblies 60 are contemplated. In addition, in some examples, the wheels 58 are not caster wheels and may be non-steerable, steerable, non-powered, powered, or combinations thereof. Additional wheels are also contemplated. For example, the patient support apparatus 30 may comprise four non-powered, non-steerable wheels, along with one or more powered wheels. In some cases, the patient support apparatus 30 may not comprise any wheels.

In other examples, one or more auxiliary wheels (powered or non-powered), which are movable between stowed positions and deployed positions, may be coupled to the support structure 32. In some cases, when these auxiliary wheels are located between caster assemblies 60 and contact the floor surface in the deployed position, they cause two of the caster assemblies 60 to be lifted off the floor surface thereby shortening a wheel base of the patient support apparatus 30. A fifth wheel may also be arranged substantially in a center of the base 34.

Referring to FIGS. 2-5, illustrations of the base 34 and other parts of the support structure 32 are shown. The base 34 of the support structure 32 is configured to support the patient support deck 38 from a ground surface. The illustrated base frame assembly 35 of the base 34 generally comprises a first frame assembly 74 (also referred to as a "caster frame assembly") and a second frame assembly 76 (also referred to as a "scale frame assembly"). The first frame assembly 74 comprises a pair of outer frame support members 78 and a pair of cross support members 80. Each outer frame support member 78 extends along (e.g., substantially parallel to) the longitudinal axis L. The cross support members 80 each extend between the outer frame support members 78 along (e.g., parallel to) a transverse axis T. The wheels 58 are coupled to the first frame assembly 74 to facilitate movement of the base 34 along the ground surface, and are arranged at the ends of the cross support members 80.

The second frame assembly 76 comprises a pair of inner frame support members 82 that each extend along (e.g., parallel to) the longitudinal axis L. One or more lift arms 72 are coupled to the second frame assembly 76 between the deck support frame 36 and the inner frame support members 82 for coupling the patient support deck 38 to the inner frame support members 82.

The patient support apparatus 30 comprises a load cell assembly, generally indicated at 84, configured to sense weight applied to the first frame assembly 74 by the second frame assembly 76, as described in greater detail below. That is, the load cell assembly 84 is interposed between the first and second frame assemblies 74, 76 to sense force acting on the first frame assembly 74 associated with weight applied to the second frame assembly 76. In the representative examples illustrated herein, the patient support apparatus 30 employs a total of four load cell assemblies 84 which each support the second frame assembly 76 relative to the first frame assembly 74. More specifically, one load cell assembly 84 is coupled to each end of both of the inner frame support members 82 such that load cell assemblies 84 are arranged in each of the four quadrants of the base 34. However, and as will be appreciated from the subsequent description below, other arrangements and/or quantities of load cell assemblies 84 are contemplated by the present disclosure.

In some examples, the patient support apparatus 30 may employ a scale system that comprises a computer control system coupled in communication with one or more of the load cell assemblies 84 for measuring a weight of a patient based on signals received from the load cell assemblies 84. Additionally or alternatively, the computer control system may comprise one or more microcontrollers, field programmable gate arrays, systems on a chip, discrete circuitry, and/or other suitable hardware, software, or firmware that is capable of carrying out the functions described herein. The computer control system may be carried on-board the patient support apparatus 30, or may be remotely located.

Referring to FIGS. 5-14, illustrations of one of the load cell assemblies 84 are shown. As is best shown in FIGS. 7-10, the illustrated load cell assembly 84 comprises a load cell swing support assembly 86 and a load cell element 88. In the representative examples illustrated herein, the swing support assembly 86 is coupled to the first frame assembly 74, and the load cell element 88 is coupled to the second frame assembly 76. However, it will be appreciated that this relationship could be inverted for one or more of the load cell assemblies 84 in certain examples, such that the swing support assembly 86 could be coupled to the second frame assembly 76, and the load cell element 88 could be coupled to the first frame assembly 74 (not shown). Other configurations are contemplated.

As noted above, in the representative examples illustrated herein, the swing support assembly 86 is coupled to the first frame assembly 74, and the load cell element 88 is coupled to the second frame assembly 76. More specifically, the load cell element 88 is coupled to an inner scale tube 90 of one of the inner frame support members 82. The load cell element 88 is mounted onto the swing support assembly 86 such that the second frame assembly 76 is movable with respect to the first frame assembly 74 along a first axis 92 parallel to the longitudinal axis L (represented by arrow 94 in FIG. 12) and a second axis 96 parallel to the transverse axis T (represented by arrow 98 in FIG. 11).

Figure 10:
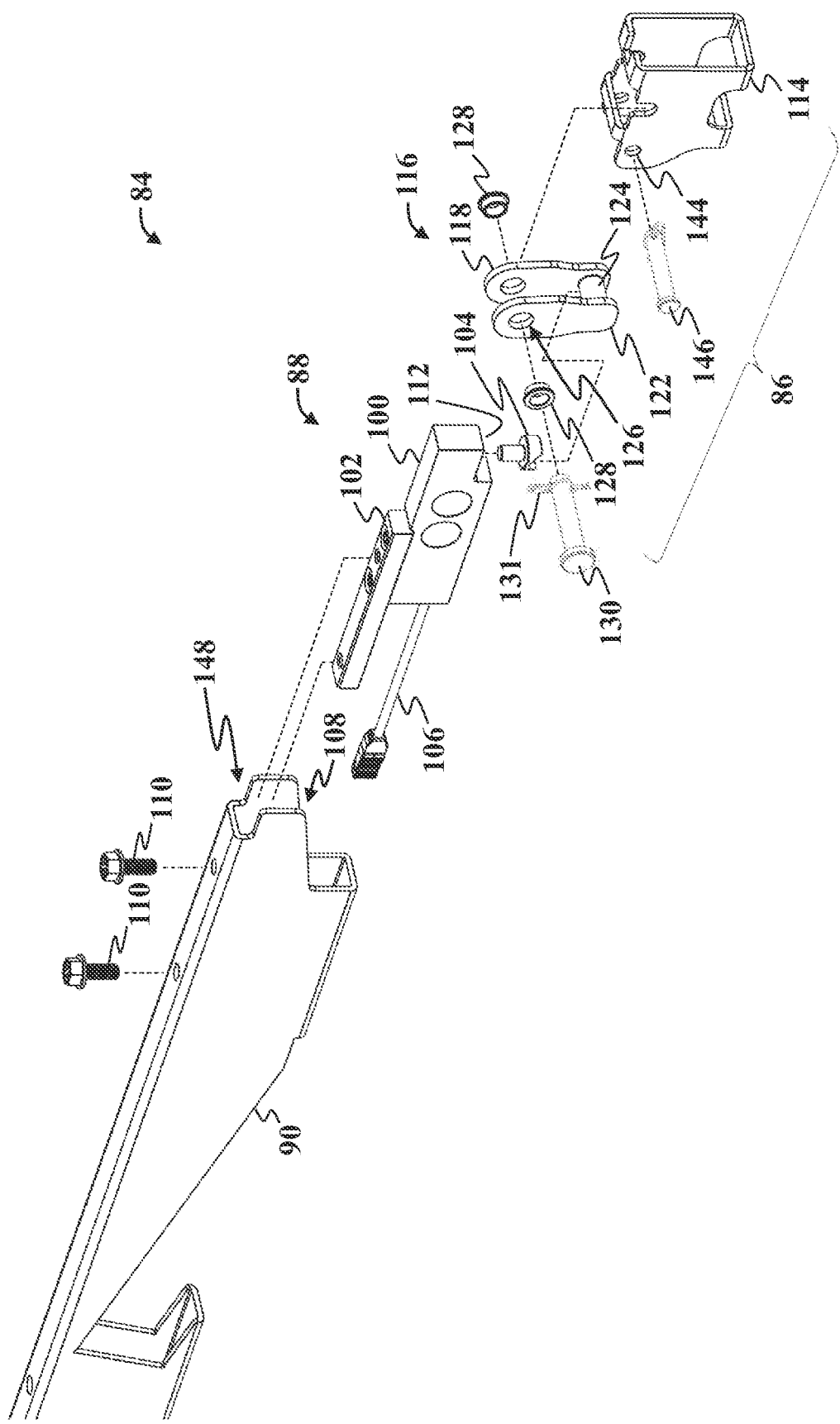

Referring to FIG. 10, the load cell element 88 generally comprises a load cell beam element 100, a mounting bar 102, and a first pivot mount 104. A connector assembly 106 extends outwardly from the load cell beam element 100 and is configured to be connected (e.g., via wired and/or wireless electrical communication, or a combination of both wired and wireless electrical communication) to the computer control system of the patient support apparatus 30 to transmit data indicating loads sensed by the load cell beam element 100. To this end, the load cell beam element 100 of the load cell element 88 may comprise one or more strain gauges (not shown, but generally known in the related art) disposed in electrical communication with the connector assembly 106. Here, those having ordinary skill in the art will recognize the illustrated load cell beam element 100 as being of the "single end shear beam load cell" type, configured so as to be supported via the mounting bar 102 adjacent a first end of the load cell beam element 100 and loaded via the swing support assembly 86 adjacent an opposite second end of the load cell beam element 100. However, it will be appreciated that other configurations are contemplated, and the load cell element 88 could be of other types, configurations, and the like.

The mounting bar 102 is coupled to an upper surface of the load cell beam element 100 (e.g., via one or more fasteners; not shown in detail) and extends outwardly from the load cell beam element 100. The second frame assembly 76 comprises an inner frame support member 82 having an inner surface that defines a frame cavity 108, and the load cell assembly 84 is at least partially positioned within the frame cavity 108 and extends outwardly from the inner frame support member 82 towards the first frame assembly 74. The mounting bar 102 is also coupled to the second frame assembly 76 (e.g., to the inner scale tube 90 of the inner frame support member 82) to support the load cell beam element 100. In some examples, such as shown in FIG. 10, the inner scale tube 90 may comprise an inner surface that defines the frame cavity 108 extending along the length of the inner scale tube 90. In FIG. 10, the load cell assembly 84 is positioned substantially within the frame cavity 108 and extends outwardly from the inner frame support member 82 and towards the first frame assembly 74. The mounting bar 102 may be coupled to the inner scale tube 90 with at least one fastener that extends through an outer surface of the inner frame support member 82. However, other configurations are contemplated.

Figure 9:
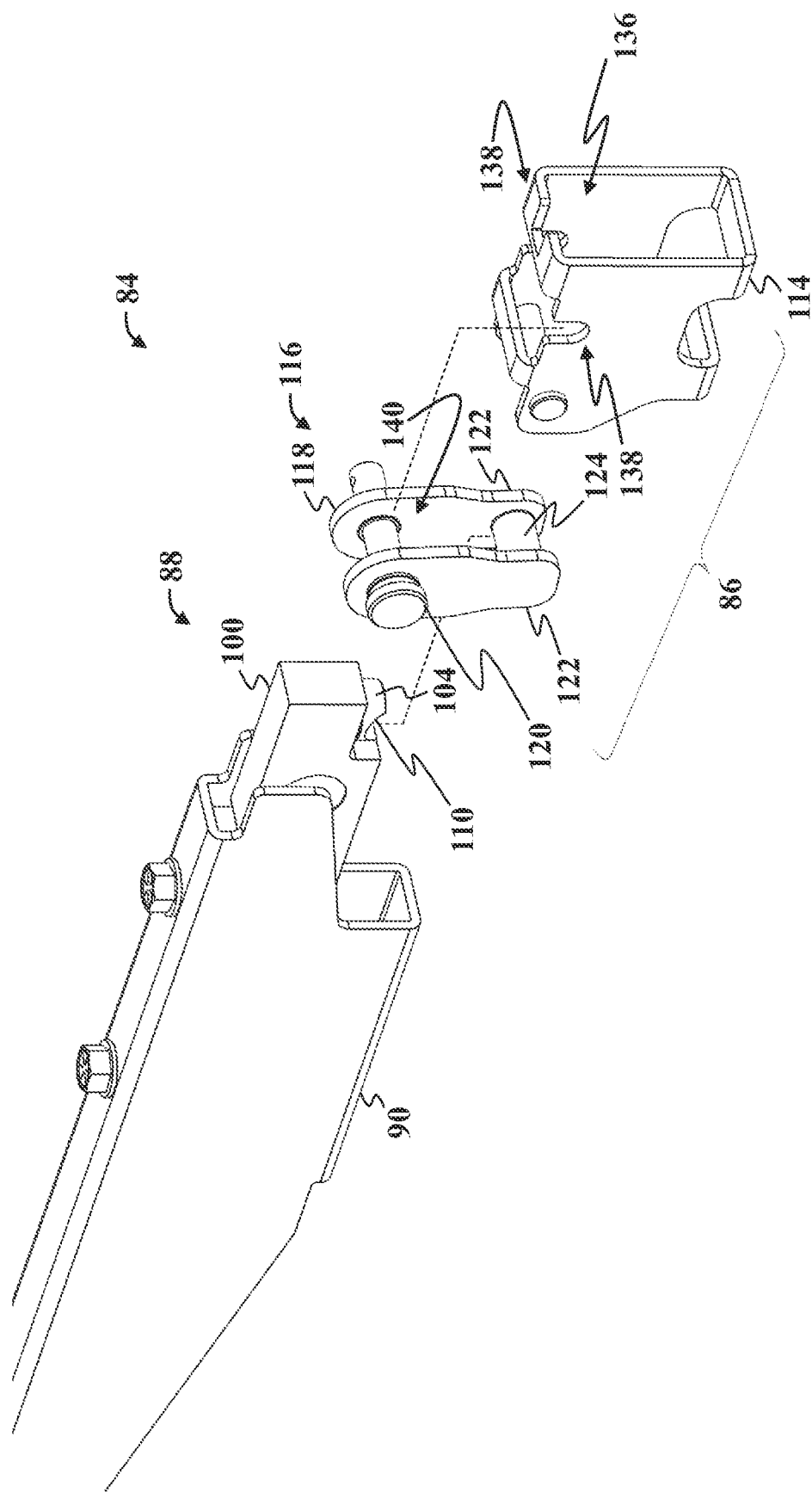

The first pivot mount 104 is coupled to an end of the load cell beam element 100 and is mounted onto the swing support assembly 86 for movement relative thereto, as described in greater detail below. The first pivot mount 104 extends outwardly from a lower surface of the load cell beam element 100. In some examples, the load cell element 88 is coupled to the inner frame support member 82 such that the first pivot mount 104 extends outwardly from the load cell beam element 100 along (e.g., parallel to) the vertical axis V. As shown in FIG. 9, the first pivot mount 104 comprises a body having a substantially cylindrical shape, a fastening member extending outwardly from the body, and an arcuate contact surface 110 defined along an outer surface of the first pivot mount 104. The fastening member is sized and shaped to be received within a corresponding opening defined along the lower surface of the load cell beam element 100 to facilitate coupling the first pivot mount 104 to the load cell beam element 100. The arcuate contact surface 110 is sized and shaped to contact the swing support assembly 86 and enable the load cell element 88 to pivot with respect to the swing support assembly 86.

In a typical example, the load cell assembly 84 comprises: a load cell element 88 coupled to one of the first frame assembly 74 and the second frame assembly 76; the first pivot mount 104 operatively attached to the load cell element 88; a second pivot mount 138 operatively attached to the other of the first frame assembly 74 and the second frame assembly 76; and a swing link 116. The swing link 116 is arranged for pivoting movement relative to the first pivot mount 104 and arranged for pivoting movement relative to the second pivot mount 138 such that the second frame assembly 76 is movable with respect to the first frame assembly 74 relative to the first axis 92 arranged parallel to the longitudinal axis L, and is movable with respect to the first frame assembly 74 relative to the second axis 96 spaced from the first axis 92. In one example illustrated throughout the figures, the load cell element 88 is coupled to the second frame assembly 76 and the second pivot mount 138 is coupled to the first frame assembly 74 such that the swing link 116 is pivotably mounted on the second pivot mount 138 and the first pivot mount 104 is configured to swing on the swing link 116 thereby movably coupling the first frame assembly 74 and the second frame assembly 76. Of course, in other examples not illustrated in the drawings, the load cell element 88 is coupled to the first frame assembly 74 and the second pivot mount 138 is coupled to the second frame assembly 76 such that the swing link 116 is pivotably mounted on the first pivot mount 104 and the second pivot mount 138 is configured to swing on the swing link 116 thereby movably coupling the first frame assembly 74 and the second frame assembly 76.

In some examples, such as is shown in FIGS. 9 and 10, the load cell beam element 100 may comprise a recessed portion 112 defined along an outer surface of the load cell beam element 100. Here, the recessed portion 112 comprises the corresponding opening and is sized and shaped to receive the first pivot mount 104 therein. In some examples, the recessed portion 112 comprises a threaded opening that is sized and shaped to receive a corresponding threaded fastening member extending outwardly from the body of the first pivot mount 104 to facilitate coupling the first pivot mount 104 to the load cell beam element 100. In other examples, the first pivot mount 104 may include a nonthreaded fastening member.

The swing support assembly 86 comprises a support tube 114 and the swing link 116. The support tube 114 is mounted to the first frame assembly 74. The swing link 116 is pivotably mounted to the support tube 114, and the load cell beam element 100 is pivotably mounted to the swing link 116.

That is, the load cell element 88 is operatively attached to the second frame assembly 76 and supports the first pivot mount 104 while the swing link 116 is coupled to the first frame assembly 74. In many such examples, the swing link 116 includes a first shaft 130 arranged for pivoting movement relative to the first frame assembly 74, a second shaft 124 arranged for pivoting movement relative to the first pivot mount 104, and a link 118 coupled to the first shaft 130 and to the second shaft 124, the link 118 being arranged to pivot about a pivot axis defined by the first shaft 130 to permit the second frame assembly 76 to move relative to the first frame assembly 74 in a direction following the longitudinal axis L. More specifically, the first shaft 130 is rotatably coupled with the second pivot mount 138 and said second shaft 124 is rotatably coupled with the first pivot mount 104 to facilitate said pivoting movement.

As is described in detail below, the first shaft 130 is also configured to slide along the pivot axis to allow the second frame 76 to move in a direction parallel the transverse axis T.

Figure 15:
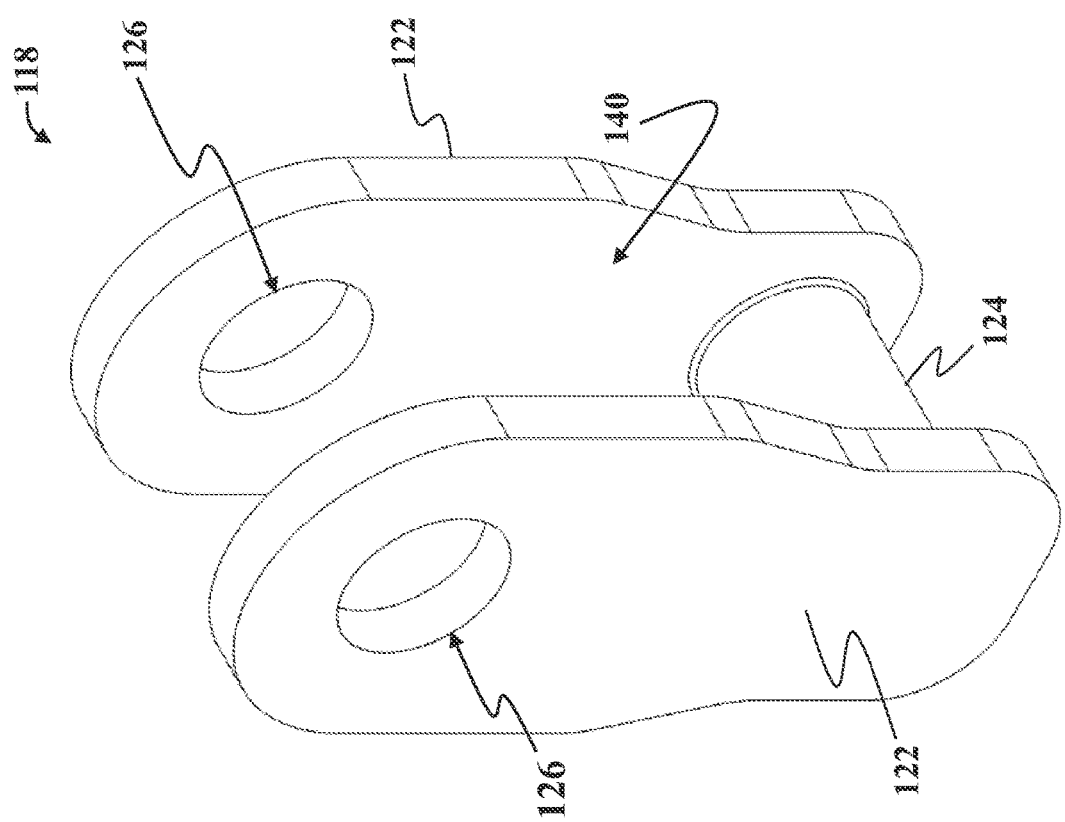
FIG. 15 is an isolated perspective view of a first example of a link of a swing link.
Figure 16:
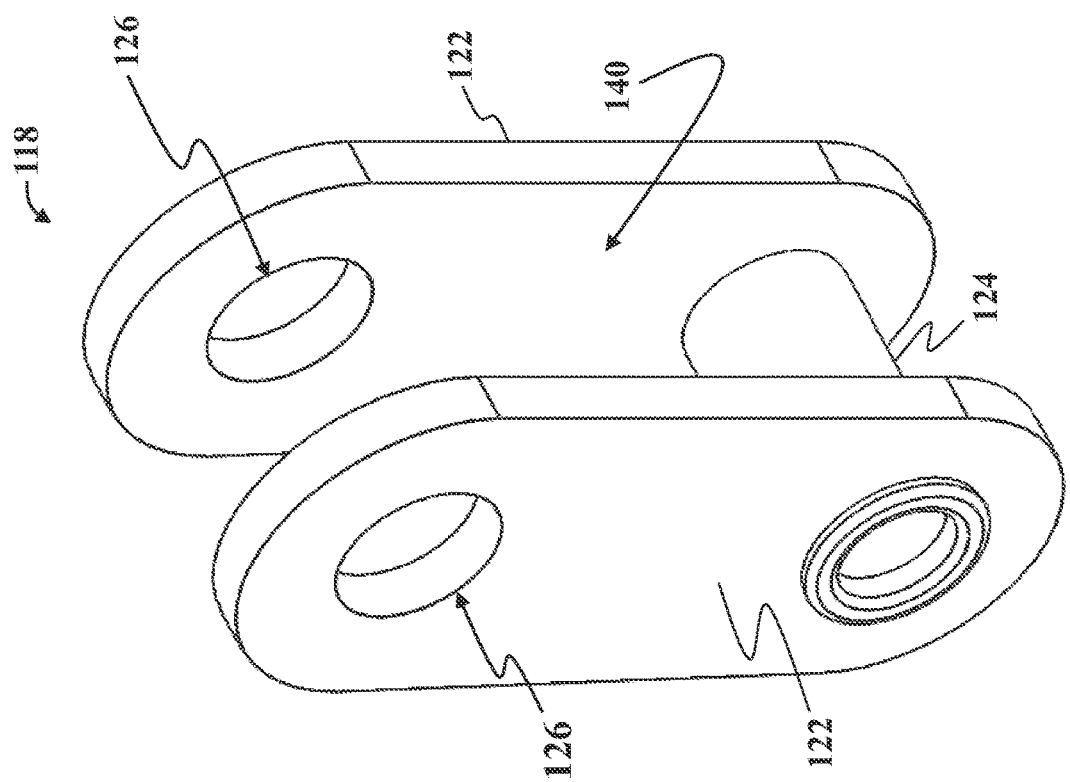
FIG. 16 is an isolated perspective view of a second example a link of a swing link.

The swing link 116 includes the link 118 and a pivot shaft assembly 120 coupled to the link 118. In some configurations, the link 118 includes a pair of flange plates 122 that extend between an upper portion and a lower portion of the link 118. In many such configurations, a second shaft 124 is coupled between the pair of flange plates 122 and positioned near a lower portion of the swing link 116. FIGS. 15 and 16 illustrate two different examples of the link 118 with the second shaft 124 coupled between the pair of flange plates 122 and positioned near a lower portion of the swing link 116. The second shaft 124 that is positioned near a lower portion of the swing link 116 is shaped to saddle the first pivot mount 104 such that the second shaft 124 contacts an arcuate contact surface 110 of the first pivot mount 104.

In one example, each flange plate 122 includes a plate opening 126 that is defined along the upper portion and is sized and shaped to receive the pivot shaft assembly 120 therethrough. In this example, the pivot shaft assembly 120 includes a pair of bushings 128 (e.g. low friction bronze bushings and the like), a first shaft 130, and a shaft clip 131 for securing the pivot shaft assembly 120 to the link 118. The first shaft 130 extends through each bushing 128, with each bushing 128 positioned within a corresponding plate opening 126 to allow the link 118 to pivot with respect to the first shaft 130 about a first pivot axis 132 defined along a centerline axis of the first shaft 130. In addition, the bushings 128 are configured slide along an outer surface of the first shaft 130 to allow the link 118 to move with respect to the first shaft 130. That is, the bushings 128 are configured to slide along the first shaft 130 to allow the swing link 116 to move back and forth along an axis defined by the first shaft 130 such that the second frame assembly 76 is movable with respect to the first frame assembly 74 in a direction parallel the transverse axis T.

Figure 11:
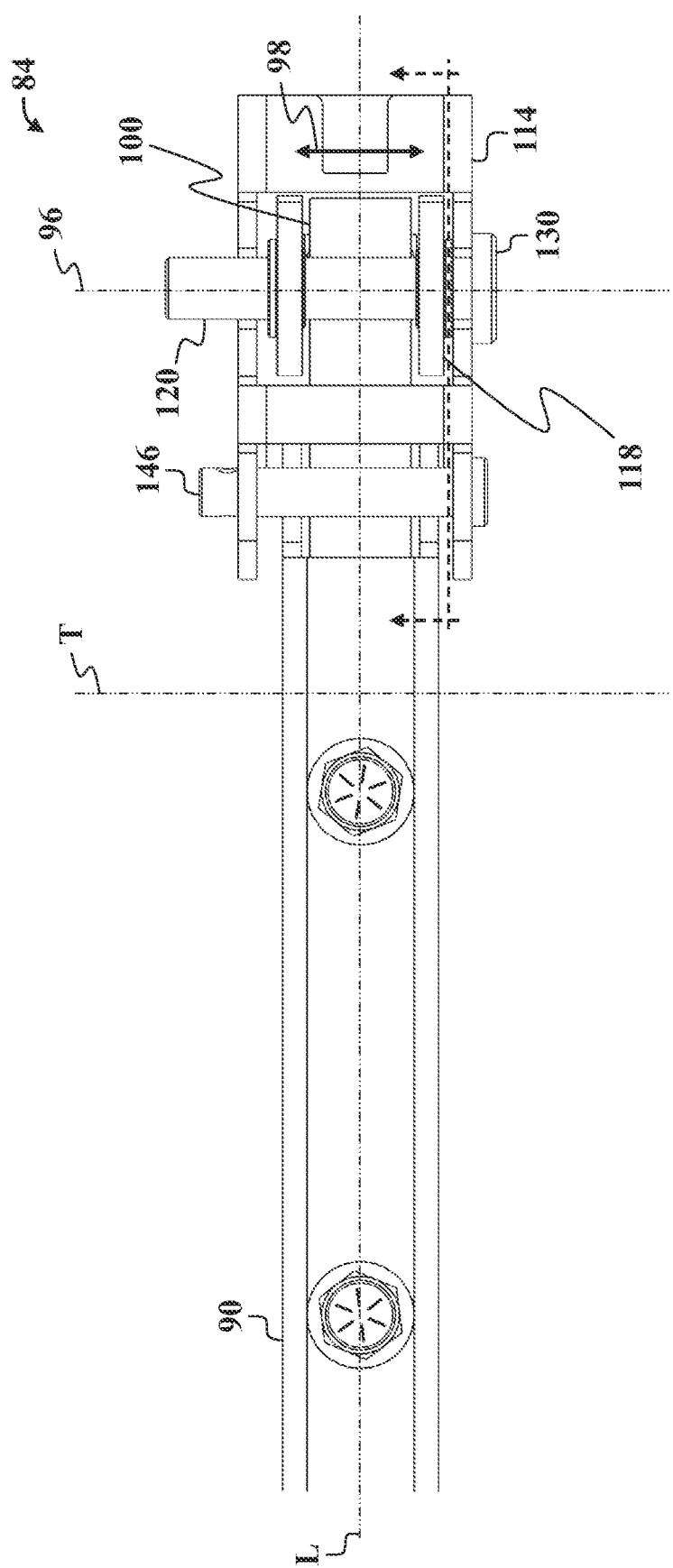
FIG. 11 is a top view of the load cell assembly of FIG. 7.

The support tube 114 is coupled to one of the cross support members 80 of the first frame assembly 74, and is mounted within a window 134 extending through the cross support member 80. The support tube 114 comprises a substantially rectangular cross-sectional shape having an inner surface that defines a bracket cavity 136 extending therethrough. The support tube 114 includes a second pivot mount 138 comprising a pair of opposing u-shaped contact surfaces 139 defined along an upper surface of the support tube 114. Each u-shaped recessed portion 139 includes an open end that is sized and shaped to receive the first shaft 130 therethrough such that the first shaft 130 is positioned within opposing u-shaped contact surfaces 139 with the swing link 116 mounted to the support tube 114. As shown in FIG. 11, with the swing link 116 mounted to the support tube 114, the bushings 128 allow the link 118 to slide along the second axis 96.

The first pivot mount 104 is mounted onto the second shaft 124 of the swing link 116 such that the second shaft 124 contacts the arcuate contact surface 110 of the first pivot mount 104. The flange plates 122 are spaced a distance apart such that a gap 140 is defined between the opposing flange plates 122 that is sized and shaped to receive the load cell beam element 100 therethrough with the first pivot mount 104 mounted to the second shaft 124. In addition, the second shaft 124 is spaced at a distance from the first shaft 130 such that the load cell beam element 100 is positioned between the first shaft 130 and the second shaft 124 with the load cell beam element 100 mounted to the second shaft 124. With the load cell beam element 100 mounted onto the second shaft 124, the arcuate contact surface 110 of the first pivot mount 104 allows the load cell beam element 100 to pivot with respect to the second shaft 124 along a second pivot axis 142 defined along a centerline axis of the second shaft 124.

As such, the first shaft 130 is supported by the second pivot mount 138 and the second shaft 124 that supports the first pivot mount 104. The swing link 116 is configured to pivot about the first pivot axis 132 defined along a centerline axis of the first shaft 130 and pivot about the second pivot axis 142 defined along a centerline axis of the second shaft 124 to allow back and forth swinging movement of the second frame assembly 76 in a direction following the longitudinal axis L.

Figure 12:
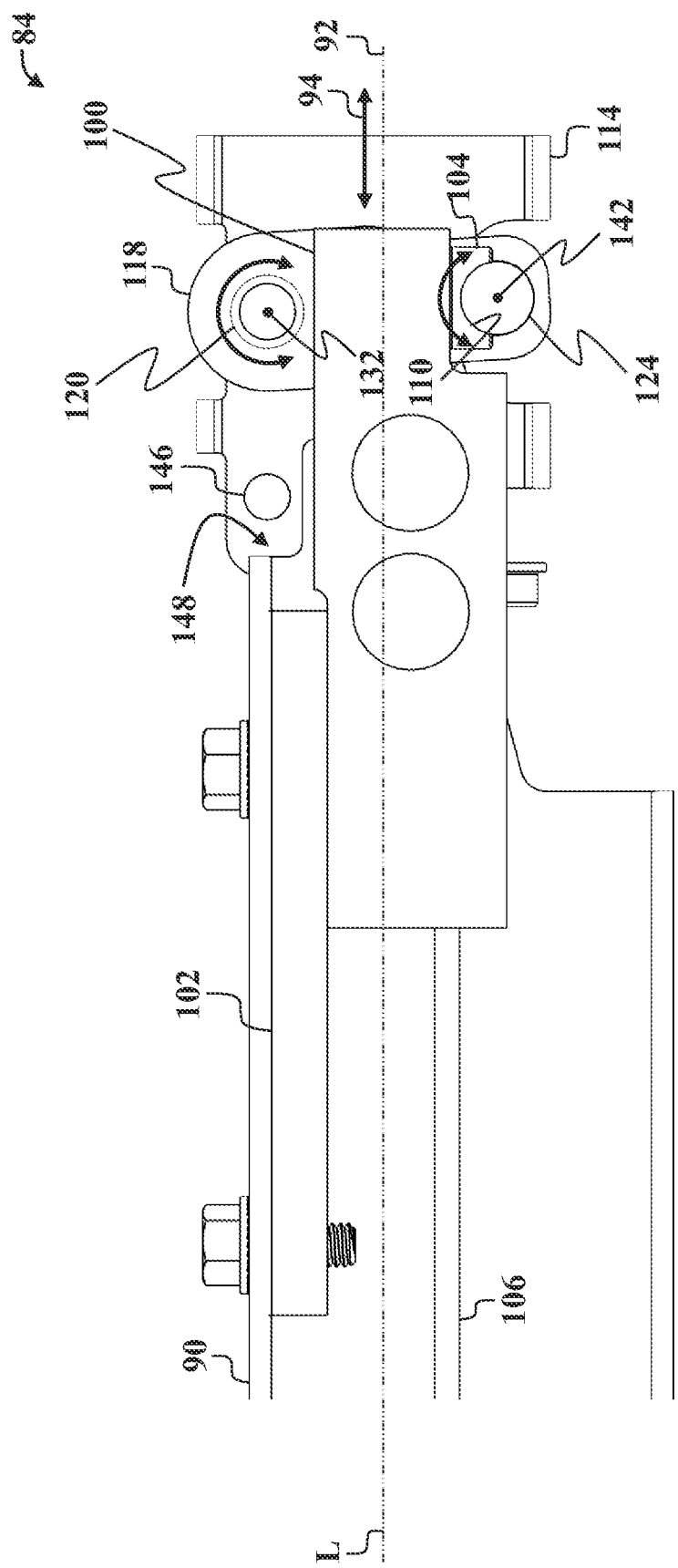
FIG. 12 is a partial sectional view of the load cell assembly taken along line 12-12 of FIG. 7.
Figure 14:
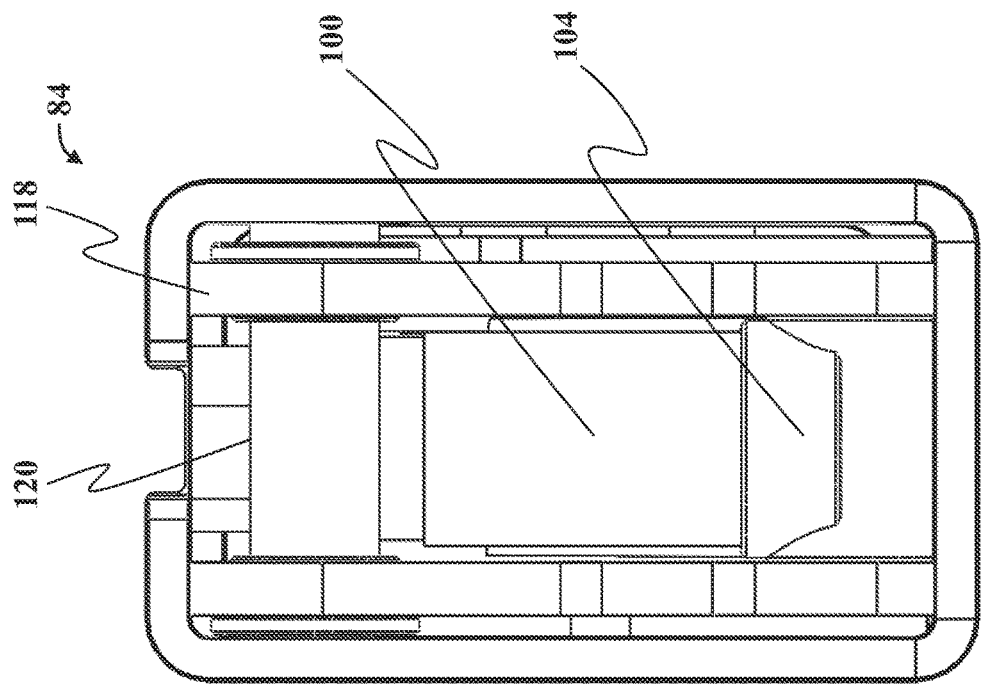
FIG. 14 is a front elevation view of the load cell assembly of FIG. 13.
Figure 13:
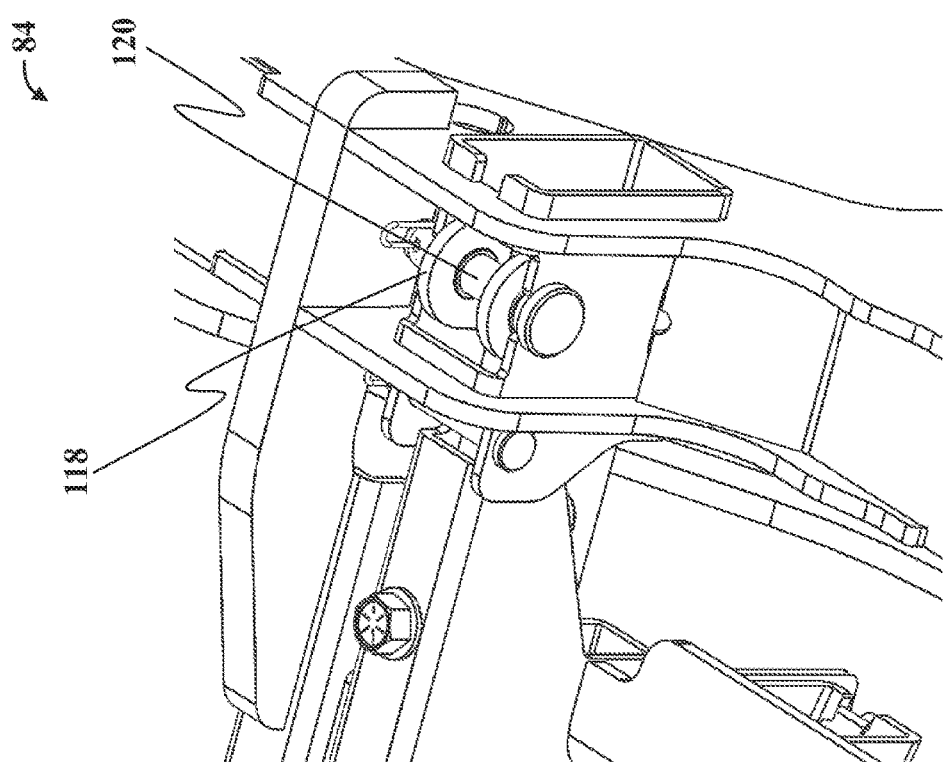
FIG. 13 is a perspective view of the load cell assembly of FIG. 5.

The swing link 116, the first pivot mount 104, and a portion of the load cell beam element 100, are positioned substantially within the bracket cavity 136 of the support tube 114. As shown in FIGS. 7 and 12, with the swing link 116 mounted to the support tube 114, the swing link 116 is allowed to pivot about the first pivot axis 132. In addition, with the arcuate contact surface 110 of the first pivot mount 104 mounted to the second shaft 124, the load cell beam element 100 is allowed to pivot with respect to the swing link 116 about the second pivot axis 142 orientated substantially parallel to the first pivot axis 132. However, it will be appreciated that other configurations are contemplated. By allowing the swing link 116 to pivot with respect to the support tube 114 and allowing the load cell beam element 100 to pivot with respect to the swing link 116, the load cell beam element 100 and the second frame assembly 76 is movable with respect to the first frame assembly 74 along the first axis 92 parallel to the longitudinal axis L. In addition, by allowing the swing link 116 to move with respect to the support tube 114 along the second axis 96, the load cell beam element 100 and the second frame assembly 76 are movable with respect to the first frame assembly 74 along the second axis 96 parallel to the transverse axis T (represented by arrow 98 in FIG. 11).

The support tube 114 may also comprise shaft openings 144 for receiving the first shaft 103 and shaft pin 146. The shaft pin 146 is sized, shaped, and orientated to limit movement of the second frame assembly 76 along the longitudinal axis L. To this end, as shown in FIG. 10, the inner scale tube 90 may comprise a notch 148 defined along an outer surface of the inner scale tube 90. Here, the load cell element 88 is mounted onto the swing support assembly 86 such that the shaft pin 146 is positioned within the notch 148 and a gap 140 is defined between the shaft pin 146 and the outer surface of the inner scale tube 90. As the second frame assembly 76 is along the longitudinal axis L, the inner scale tube 90 may contact the shaft pin 146 to limit further movement along the longitudinal axis L. It will be appreciated that each corner of the base 34 may employ a shaft pin 146 and support tube 114 adjacent to a respective load cell element 88. However, other configurations are contemplated.

The present disclosure includes a swing concept using the swing link 116 with the load cell assembly 84. The load cell element 88 is suspended from the caster frame with the link 118. The link 118 is coupled to the caster frame with the first shaft 103 which allows the link 118 and the load cell element 88 to pivot about the first shaft 103. The load cell element 88 is supported on a second shaft coupled to the link 118 that allows the load cell element 88 to swing with respect to the caster frame. The scale frame sits within the caster frame and is able to freely move longitudinally towards head end and foot end and across the width of the caster frame through the windows 134 defined through the caster frame. The scale frame can move along the longitudinal axis L and the transverse axis T as well, to account for tolerance stacks during assembly. The scale frame can swing and/or slide, giving the degrees of freedom needed for scale accuracy. In other examples, the load cell assembly 84 may also allow the scale frame to rotate, swing, slide, and/or pivot about one or more of the longitudinal, vertical, and transverse axes, providing additional degrees of freedom. The load cell element 88 is supported on the inner scale tube 90 of the scale frame. The load cell element 88 is pivotally coupled to the link allowing the longitudinal frame tolerances. The first pivot mount 104 acts as a pivot supported on the second shaft 124 of the link 118, allowing the load cell element 88 to self-align on the second shaft 124 during the assembly process. This accounts for any variation and tolerances in alignments of the weldments. During assembly, relying on gravity, the load cell assembly 84 allows the scale frame to settle out into a neutral state, thereby providing good scale accuracy results. To facilitate assembly, the windows 134 are defined in the caster frame to allow the load cell element 88 to be accessed and installed easily, as the load cell element 88 can pass through the window in the caster frame for assembly purposes. The scale frame can move from the left side to the right side and from the head end to the foot end. In some examples, the longitudinal motion of the scale frame may be limited with the end of the scale frame tube contacting the inner frame wall of the caster frame to act as an ultimate limit stop to accommodate for impact and overload testing.

To accurately weigh a patient, the scale frame must be supported through load cell elements 88 to a support the caster frame. The load cell elements 88 must only carry the weight of the scale frame; they cannot be loaded by friction between the weigh frame and bed support frame in any significant way. The load cell elements 88 may be contained within the scale frame and bed support frame with allowance for misalignment and manufacturing tolerances. To achieve this lack of load inducing friction, the load cell element 88 rests on the swing link 116 that can rotate with the load cell element 88 as well as pivot with respect to the caster frame. In addition, smooth surface finishes between mating components ensure low friction and consistent load transfer to the load cell element 88. The swing link 116 utilizes bronze bushings to obtain low friction. To contain the load cell element 88 within the frame, the load cell assembly 84 may pivot to contact retaining walls and pins (e.g. support tube 114 and shaft pin 146). The scale frame has sufficient weight to overcome friction and therefore use gravity to self-center. The retaining walls and pins have been designed such that the combination of misalignment's and manufacturing tolerances will not contact the load cell elements 88 on a still bed. This eliminates the possibility of friction between the swing link 116 and the load cell elements 88 causing inaccuracy during a scale reading. The mobility of the system due to free rotation of the swing link 116 and load cell elements 88 ensures that the system will not bind due to misalignment's and manufacturing tolerances.

The present disclosure includes the swing link 116 in tension which allows the scale system to self-center. This feature moves the load cell element 88 away from any restraining wall or pin after impact, thus improving scale accuracy. The swing support assembly self-adjusts for tolerances by design and does not require resilient materials to function, thus sustaining a larger safe working load and higher accuracy.

In this way, the examples of the present disclosure afford significant opportunities in connection with patient support apparatuses 30 by, among other things, ensuring that load cell beam elements 100 can be utilized reliably, consistently, and durably. More specifically, it will be appreciated that the load cell assemblies 84 disclosed herein can be employed without utilizing overtly-expensive load cell beams, in that the components of the load cell element 88 and the swing support assembly 86 cooperate to facilitate the relative movement between the first and second frame assemblies 74, 76 which, among other things, prevents damage to the load cell beam elements 100 and ensures consistent and reliable operation of the load cell assemblies 84.

Several examples have been discussed in the foregoing description. However, the examples discussed herein are not intended to be exhaustive or limit the disclosure to any particular form. The terminology which has been used is intended to be in the nature of words of description rather than of limitation. Many modifications and variations are possible in light of the above teachings and the disclosure may be practiced otherwise than as specifically described.

What is claimed is:

1. A patient support apparatus comprising:
a patient support deck for supporting a patient;
a base frame assembly defining a longitudinal axis and a transverse axis and configured to support said patient support deck from a ground surface, said base frame assembly comprising a first frame assembly supporting a plurality of wheels to facilitate movement of said patient support apparatus along the ground surface, and a second frame assembly supporting one or more lift arms coupling said patient support deck to said second frame assembly; and
a load cell assembly interposed between said first and second frame assemblies to sense force acting on said first frame assembly associated with weight applied to said second frame assembly, said load cell assembly comprising:
a load cell element coupled to one of said first frame assembly and said second frame assembly;
a first pivot mount operatively attached to said load cell element;
a second pivot mount operatively attached to the other of said first frame assembly and said second frame assembly; and
a swing link arranged for pivoting movement relative to said first pivot mount about a first pivot axis and arranged for pivoting movement relative to said second pivot mount about a second pivot axis spaced vertically from said first pivot axis such that said second frame assembly is movable with respect to said first frame assembly in a direction following the longitudinal axis.

2. The patient support apparatus as set forth in claim 1, wherein said load cell element is coupled to said second frame assembly and said second pivot mount is coupled to said first frame assembly such that said swing link is pivotably mounted on said second pivot mount and said first pivot mount is configured to swing on said swing link thereby movably coupling said first frame assembly and said second frame assembly.

3. The patient support apparatus as set forth in claim 1, wherein said load cell element comprises:
a load cell beam element; and
a mounting bar coupling said load cell beam element to said second frame assembly.

4. The patient support apparatus as set forth in claim 3, wherein said second frame assembly comprises an inner frame support member having an inner surface that defines a frame cavity, said load cell assembly being at least partially positioned within said frame cavity and extending outwardly from said inner frame support member towards said first frame assembly.

5. The patient support apparatus as set forth in claim 4, wherein said mounting bar is coupled to said inner surface of said inner frame support member with at least one fastener.

6. The patient support apparatus as set forth in claim 3, wherein said first pivot mount extends from a lower surface of a load cell beam element and comprises a body having a substantially cylindrical shape and an arcuate contact surface.

7. The patient support apparatus as set forth in claim 1, wherein said first pivot mount extends between said load cell element and a contact surface on said swing link to rotatably couple said load cell assembly and said swing link to facilitate said pivoting movement.

8. The patient support apparatus as set forth in claim 1, wherein a support tube is mounted to said first frame assembly.

9. The patient support apparatus as set forth in claim 8, wherein said support tube defines said second pivot mount, which comprises a pair of opposing u-shaped contact surfaces.

10. The patient support apparatus as set forth in claim 9, wherein said swing link and said first pivot mount are positioned substantially within said support tube.

11. The patient support apparatus as set forth in claim 1, wherein said swing link comprises:
a first shaft; and
a second shaft,
wherein said first shaft is rotatably coupled with said second pivot mount and said second shaft is rotatably coupled with said first pivot mount to facilitate said pivoting movement.

12. The patient support apparatus as set forth in claim 11, wherein:
said first shaft is supported by said second pivot mount; and
said second shaft supports said first pivot mount,
wherein said swing link is configured to pivot about said first pivot axis defined along a centerline axis of said first shaft and to pivot about said second pivot axis defined along a centerline axis of said second shaft to allow back and forth swinging movement of said second frame assembly in a direction following the longitudinal axis.

13. The patient support apparatus as set forth in claim 1, wherein said swing link comprises a pair of flange plates that extend between an upper portion and a lower portion of said swing link.

14. The patient support apparatus as set forth in claim 13, wherein said swing link comprises:
said pair of flange plates extending between an upper portion and a lower portion of said swing link;
a first shaft positioned near an upper portion of said swing link; and
a second shaft positioned near a lower portion of said swing link and shaped to saddle the first pivot mount such that said second shaft contacts an arcuate contact surface of said first pivot mount.

15. The patient support apparatus as set forth in claim 14, wherein each flange plate includes a plate opening defined by said upper portion and sized and shaped to receive a first shaft.

16. The patient support apparatus as set forth in claim 14, wherein said second shaft is coupled between said pair of flange plates.

17. The patient support apparatus as set forth in claim 14, further comprising a pair of bushings for securing said first shaft to said swing link, wherein said first shaft extends through each bushing and said bushings are configured to slide along said first shaft to allow said swing link to move back and forth along an axis defined by said first shaft, said second frame assembly is movable with respect to said first frame assembly in a direction parallel the transverse axis.

18. The patient support apparatus as set forth in claim 1, wherein said second frame assembly is movable with respect to said first frame assembly in a direction following the transverse axis.

19. The patient support apparatus as set forth in claim 1, comprising at least two of said load cell assemblies.

20. A load cell assembly for use with a patient support apparatus comprising a first frame assembly and a second frame assembly and defining a longitudinal axis and a transverse axis, said load cell assembly comprising:
- a load cell element operatively attached to the second frame assembly, said load cell element supporting a first pivot mount; and
- a swing link coupled to the first frame assembly, said swing link including a first shaft arranged for pivoting movement relative to the first frame assembly, a second shaft arranged for pivoting movement relative to said first pivot mount, and a link coupled to said first shaft and to said second shaft, said link being arranged to pivot about a first pivot axis defined by said first shaft and about a second pivot axis defined by said second shaft, said second pivot axis spaced vertically from said first pivot axis, to permit the second frame assembly to move relative to the first frame assembly in a direction following the longitudinal axis.

\* \* \* \* \*